United States Patent
Müller et al.

(10) Patent No.: US 10,458,406 B2
(45) Date of Patent: Oct. 29, 2019

(54) SEAL ARRANGEMENT FOR A SWITCHABLE VANE CELL PUMP OF CARTRIDGE DESIGN

(71) Applicant: Magna Powertrain Bad Homburg GmbH, Bad Homburg (DE)

(72) Inventors: Andreas Müller, Usingen (DE); Kerstin Rosenkranz, Oberursel (DE)

(73) Assignee: MAGNA POWERTRAIN BAD HOMBURG GMBH, Bad Homburg (DE)

( * ) Notice: Subject to any disclaimer, the term of this patent is extended or adjusted under 35 U.S.C. 154(b) by 0 days.

(21) Appl. No.: 15/447,707

(22) Filed: Mar. 2, 2017

(65) Prior Publication Data

US 2017/0260979 A1 Sep. 14, 2017

(30) Foreign Application Priority Data

Mar. 11, 2016 (DE) .................. 10 2016 204 099

(51) Int. Cl.
*F04C 15/00* (2006.01)
*F01C 19/00* (2006.01)
(Continued)

(52) U.S. Cl.
CPC ........ *F04C 15/0015* (2013.01); *F01C 19/005* (2013.01); *F01C 21/108* (2013.01); *F04C 2/34* (2013.01); *F04C 2/344* (2013.01); *F04C 15/0023* (2013.01); *F04C 15/0038* (2013.01); *F16J 15/32* (2013.01); *F04C 2240/60* (2013.01)

(58) Field of Classification Search
CPC ... F04C 15/0023; F04C 15/0015; F16J 15/32; F01C 21/108; F01C 19/005
See application file for complete search history.

(56) References Cited

U.S. PATENT DOCUMENTS 6,042,343 A * 3/2000 Semba .................... F01C 21/10
417/220
6,120,270 A * 9/2000 Parsch .................. F01C 21/108
418/133
(Continued)

FOREIGN PATENT DOCUMENTS

CN 1576587 A 2/2005
CN 201884279 U 6/2011
(Continued)

OTHER PUBLICATIONS

Office Action dated Aug. 1, 2018 from corresponding Chinese Patent Application No. 201710138422.9.

*Primary Examiner* — Eugene G Byrd
(74) *Attorney, Agent, or Firm* — Dickinson Wright PLLC

(57) ABSTRACT

A seal arrangement for a vane cell pump of cartridge design which is configured such that it can be switched into multiple flows is described. The seal arrangement comprises a first seal which is arranged so as to run around the circumference of a side plate of the vane cell pump, and a second seal which is arranged so as to run around a shaft leadthrough which is provided in the side plate. The seal arrangement is distinguished by a third seal which, apart from at least one first fluid connection, shuts off at least a second fluid connection with respect to the at least one first fluid connection within a region which is configured between the first seal and the second seal.

15 Claims, 3 Drawing Sheets

Figure 1:
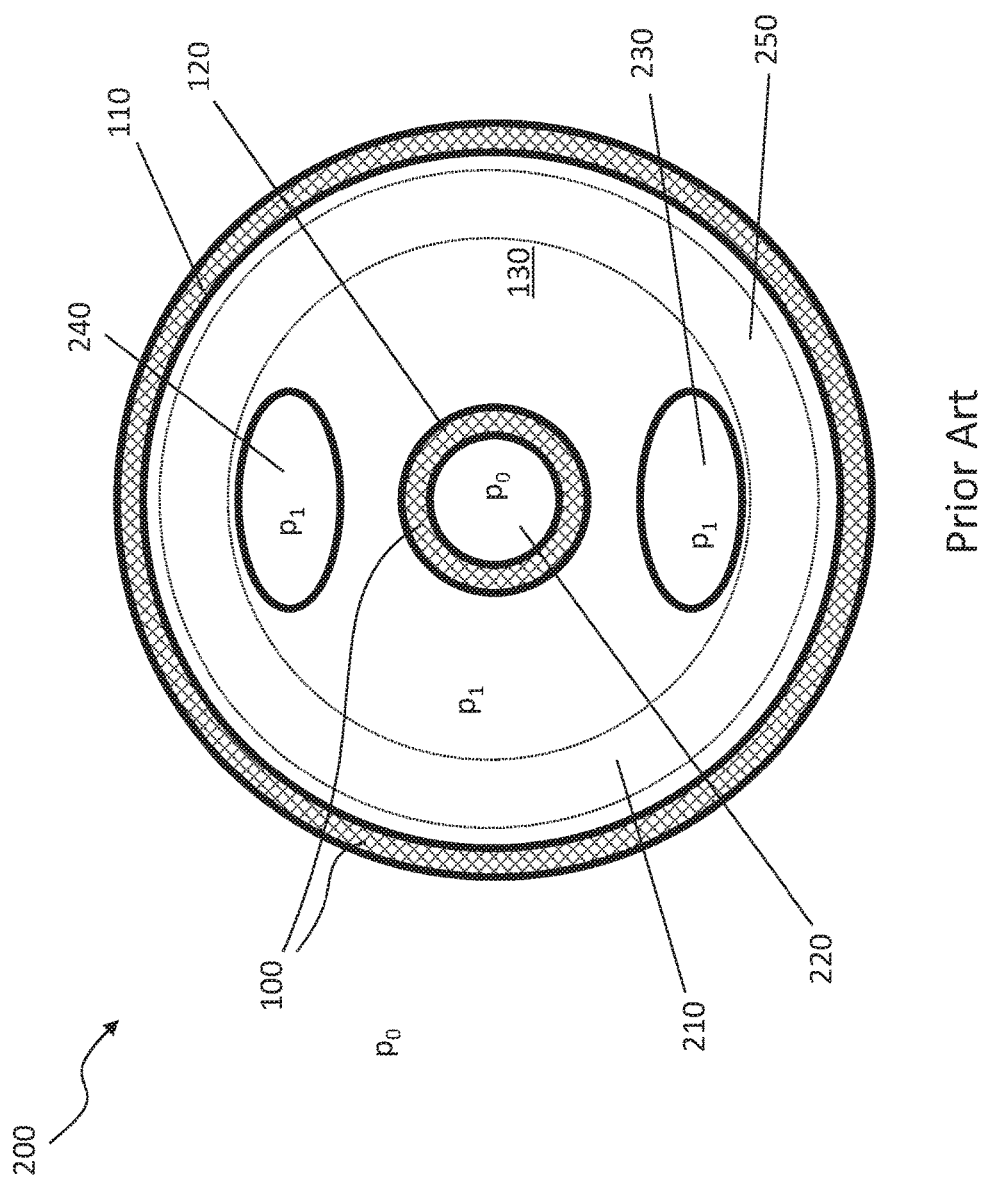

(51) Int. Cl.
  *F01C 21/10* (2006.01)
  *F04C 2/344* (2006.01)
  *F04C 2/34* (2006.01)
  *F16J 15/32* (2016.01)

(56) References Cited

U.S. PATENT DOCUMENTS

| | | | |
|---|---|---|---|
| 6,280,150 B1 * | 8/2001 | Miyazawa | F04C 14/226 |
| | | | 417/220 |
| 2006/0034721 A1 * | 2/2006 | Uchino | F04C 14/226 |
| | | | 418/29 |
| 2009/0047141 A1 * | 2/2009 | Yamamuro | F04C 2/3442 |
| | | | 417/218 |
| 2011/0211984 A1 * | 9/2011 | Zinke | F04C 15/0026 |
| | | | 418/135 |
| 2011/0211985 A1 * | 9/2011 | Dippel | F01C 21/0863 |
| | | | 418/135 |

FOREIGN PATENT DOCUMENTS

| | | | | |
|---|---|---|---|---|
| DE | 102013214926 A1 | | 6/2014 | |
| DE | 102014212022 A1 | | 1/2015 | |
| EP | 1026401 A2 * | 8/2000 | | F01C 21/108 |
| WO | WO-2013185751 A1 * | 12/2013 | | F04C 14/06 |

* cited by examiner

SEAL ARRANGEMENT FOR A SWITCHABLE VANE CELL PUMP OF CARTRIDGE DESIGN

CROSS-REFERENCE TO RELATED APPLICATIONS

This application claims the benefit and priority of German Application No. DE102016204099.5 filed Mar. 11, 2016. The entire disclosure of the above application is incorporated herein by reference.

FIELD

The invention relates to a seal arrangement for a vane cell pump of cartridge design which is configured such that it can be switched into multiple flows. More specifically, the seal arrangement includes a first seal arranged so as to run around the circumference of a side plate of the vane cell pump, and a second seal arranged so as to run around a shaft leadthrough which is provided in the side plate.

BACKGROUND

This section provides background information related to the present disclosure which is not necessarily prior art.

Vane cell pumps which are also called sliding vane rotary pumps are known, for example, from DE 10 2013 214 926 A1 and from DE 10 2014 212 022 A1.

It is known to provide vane cell pumps as hydraulic pumps in vehicle applications. For example, this preferably takes place in conjunction with transmissions, such as drive transmissions, which require a transmission pump for supplying their hydraulic functions such as clutch actuation, converter supply or cooling and lubrication of the transmission parts. Here, these can be, for example, both conventional automatic transmissions which are also called stepped automatic transmissions or modern double clutch transmissions.

Vane cell pumps can be, for example, of structurally simple configuration such that they can be switched into double flows in a manner which is dependent on temperature. This has the advantage that both flows of a vane cell pump convey the lubricating oil under pressure in the case of a high lubricating oil requirement, for example at high temperatures. Another application is, for example, the switching of one flow to a lower pressure level at a higher rotational speed as soon as the volumetric flow of one flow is sufficient.

One general aim during the development of vehicle components is low manufacturing, operating and maintenance costs.

In order to meet the aim of low manufacturing and maintenance costs, it is known to configure a vane cell pump which is provided, for example, as a transmission pump, such as an abovementioned double flow vane cell pump which is controlled, for example, in a manner which is dependent on temperature, in what is known as a cartridge design as one unit which has been completely preassembled and tested. A vane cell pump of this type of cartridge design can be configured, for example, as a plug-in transmission pump module which can be manufactured inexpensively independently of the transmission, since this happens, for example, in a completely or partially automated manner on account of the free accessibility, and/or can be assembled manually with little time expenditure, can likewise be joined to the transmission with minimum expenditure and, in the case of damage, can be replaced equally simply and rapidly.

A multiple flow vane cell pump of cartridge design comprises a rotor which is mounted such that it can be rotated about a rotational axis and is connected or can be connected to an output shaft, for example, of a transmission or a motor, such as an electric motor, a hollow-cylindrical contour ring with an inner circumferential face, which contour ring is arranged between two side plates, of which one is configured as a bottom plate and one is configured as a pressure plate, the cylinder axis of which contour ring runs parallel to the rotational axis, for example coincides with the rotational axis. If the drive of the rotor is provided from the bottom plate which lies opposite the pressure plate, the said bottom plate is also called a drive plate. The rotor has a plurality of conveying elements which can be moved radially with respect to the rotational axis and, during a rotation of the rotor, are pushed against the inner circumferential face. The latter is shaped in such a way that a number of preferably crescent-shaped conveying spaces which in each case form a pump section are configured, which number corresponds to the number of flows. The said conveying spaces are passed through by the conveying elements during a revolution of the rotor, a number of pump sections which corresponds to the number of flows being formed with in each case one suction region and in each case one pressure region. Pressure faces, what are known as pressure kidneys, are configured in the pressure plate in accordance with the pressure regions. Fluid connections, via which the vane cell pump conveys, in particular sucks, a fluid, such as lubricating oil, for example from a sump, and pumps it to consumers and/or consumption points within the transmission, can be kept clear by the bottom and/or pressure plate or can be provided therein.

For sealing with respect to a receptacle for the vane cell pump of cartridge design, which receptacle is provided in a transmission housing, a seal arrangement is provided on the vane cell pump with axial seals in the region of a side plate and/or radial seals on the outer circumference, for example as an alternative or in addition, in the region of the contour ring.

A conventional seal arrangement 100 (shown in FIG. 1) for a double flow vane cell pump 200 of cartridge design comprises a first seal ring 110 on the circumference of a side plate 210, for example an O-ring. A shaft leadthrough 220 for a drive shaft which can be connected or is connected to the rotor of the vane cell pump 200 is provided in the side plate 210. A second seal ring 120, for example a shaped seal, is arranged circumferentially around the shaft leadthrough 220. A first fluid connection 230 (also called a primary outlet) of a first flow of the vane cell pump 200 and a second fluid connection 240 (also called a secondary outlet) of a second flow of the vane cell pump 200 are provided in the side plate 210. Both the first fluid connection 230 and the second fluid connection 240 open into a common region 130 of the seal arrangement 100 between the seal rings 110, 120, which region 130 is sealed towards the outside by the first seal ring 110 and towards the inside by the second seal ring 120. In this way, both the first and the second flow of the vane cell pump 200 deliver into the region 130 at the same pressure level which forms the system pressure $p_1$. The entire region 130 which is under the same system pressure $p_1$ is sealed by means of the seal rings 110, 120 with respect to the ambient pressure $p_0$ which prevails outside the region 130. A face 250 of the side plate 210, which face 250 is delimited by two circles which are shown using dashed lines and lies within the region 130 is required for supporting a disc spring which presses the side plate 210 against the contour ring which lies underneath. A captive securing means for the side plate 210, which captive securing means is configured by way of a circlip at the shaft end, requires the shaft leadthrough 220 through the side plate 210.

In relation to operating costs which are driven substantially by energy costs, it has been shown that it is advantageous, in the case of a plurality of flows, to switch one or more flows to a lower pressure level, for example, apart from one flow, depending on the operating point, the plurality of flows being guided separately out of the vane cell pump.

Figure 2:
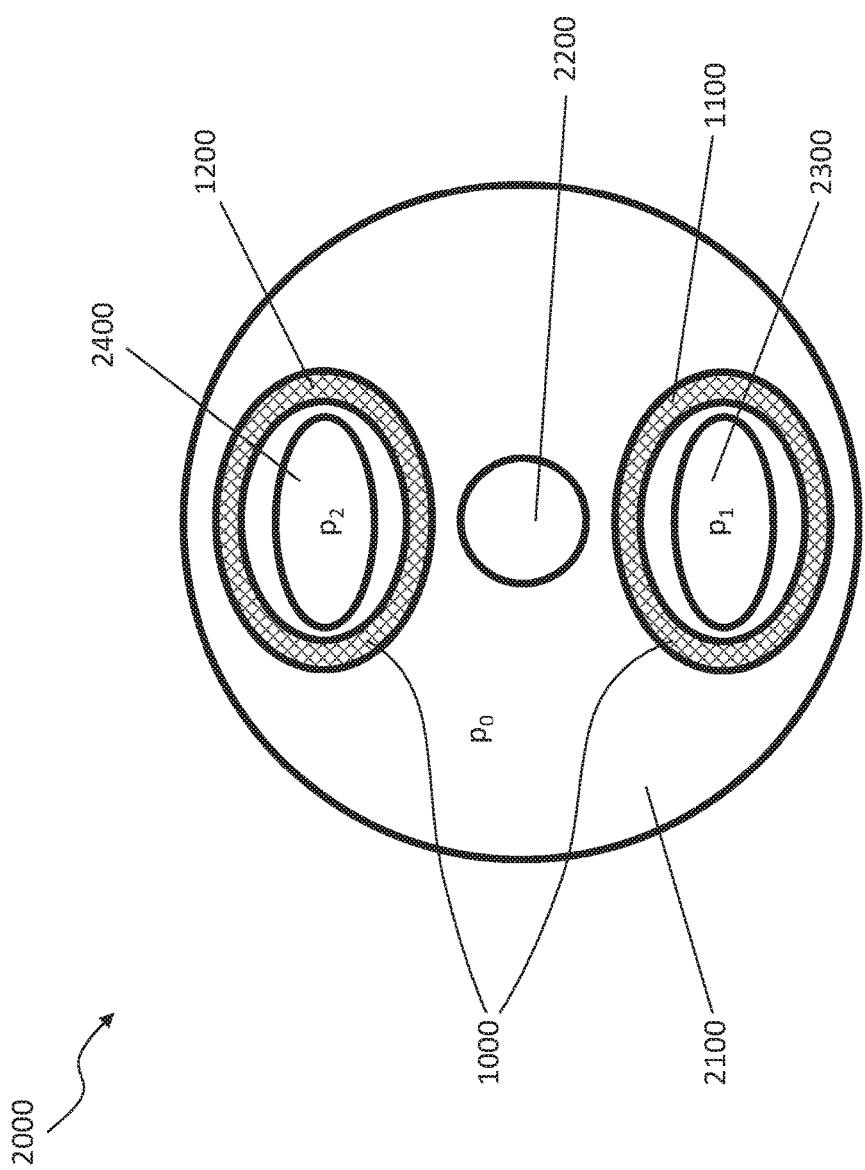

FIG. 2 shows another conventional seal arrangement 1000 of a vane cell pump 2000 of so-called stand-alone design. The stand-alone design differs from the cartridge design by way of a dedicated housing which is formed by way of a corresponding recess in the corresponding part in the case of the cartridge design. As a result, merely a seal of the flows is required in the case of the stand-alone design. A shaft leadthrough 2200 for a drive shaft which can be connected or is connected to the rotor of the vane cell pump 2000 is provided on an end side 2100 of the housing of the vane cell pump 2000. Moreover, a primary outlet 2300 of the first flow of the vane cell pump 2000 and a secondary outlet 2400 of the second flow of the vane cell pump 2000 are provided on the end side 2100. The seal arrangement 1000 comprises a first seal ring 1100 which surrounds the primary outlet 2300 and a second seal ring 1200 which surrounds the secondary outlet 2400. The first seal ring 1100 and the second seal ring 1200 press as the only spring elements against the end side 2100. The first flow and the second flow can be operated at different pressure levels $p_1$, $p_2$ as a result of the separate seals of the primary outlet 2300 and the secondary outlet 2400 both with respect to one another and with respect to the ambient pressure $p_0$.

In the case of the vane cell pump 200 (shown in FIG. 1) of cartridge design, this is not possible on account of the surface 250 which is necessary for supporting the side plate 210. In the case of this vane cell pump, the flows are guided jointly out of the pump at a common pressure level $p_1$.

SUMMARY

This section provides a general summary of the disclosure, and is not a comprehensive disclosure of its full scope of all of its features.

It is an object of the invention to develop a seal arrangement for a vane cell pump of cartridge design which is configured such that it can be switched into multiple flows, for example in a manner which is dependent on temperature, which seal arrangement makes energy-saving operation of the said vane cell pump possible.

Accordingly, the subject matter of the invention relates to a seal arrangement for a vane cell pump of cartridge design which is configured such that it can be switched into multiple flows, for example in a manner which is dependent on temperature. The seal arrangement comprises a first seal which is arranged so as to run around the circumference of a side plate, preferably the pressure plate of the vane cell pump. Moreover, the seal arrangement comprises a second seal which is arranged so as to run around a shaft leadthrough which is provided in a side plate, preferably the pressure plate of the vane cell pump, for a drive shaft which can be connected or is connected to a rotor of the vane cell pump.

The seal arrangement according to the present invention is distinguished by the fact that, moreover, it comprises a third seal which, apart from at least one remaining fluid connection which forms an outlet of remaining flow of the vane cell pump, shuts off at least one fluid connection which forms an outlet of at least one flow of the vane cell pump and is provided in or on a side plate, preferably the pressure plate of the vane cell pump, with respect to the at least one remaining fluid connection within a region which is configured between the first seal and the second seal.

As an alternative or in addition, the seal arrangement of the present invention can have individual features or a combination of a plurality of features described in the introduction in conjunction with the prior art and/or described in one or more of the documents mentioned with respect to the prior art and/or described in the following description with respect to the exemplary embodiments which are shown in the drawings.

Further areas of applicability will become apparent from the description provided herein. The description and specific examples in this summary are intended for purposes of illustration only and are not intended to limit the scope of the present disclosure.

DRAWINGS

Figure 3:
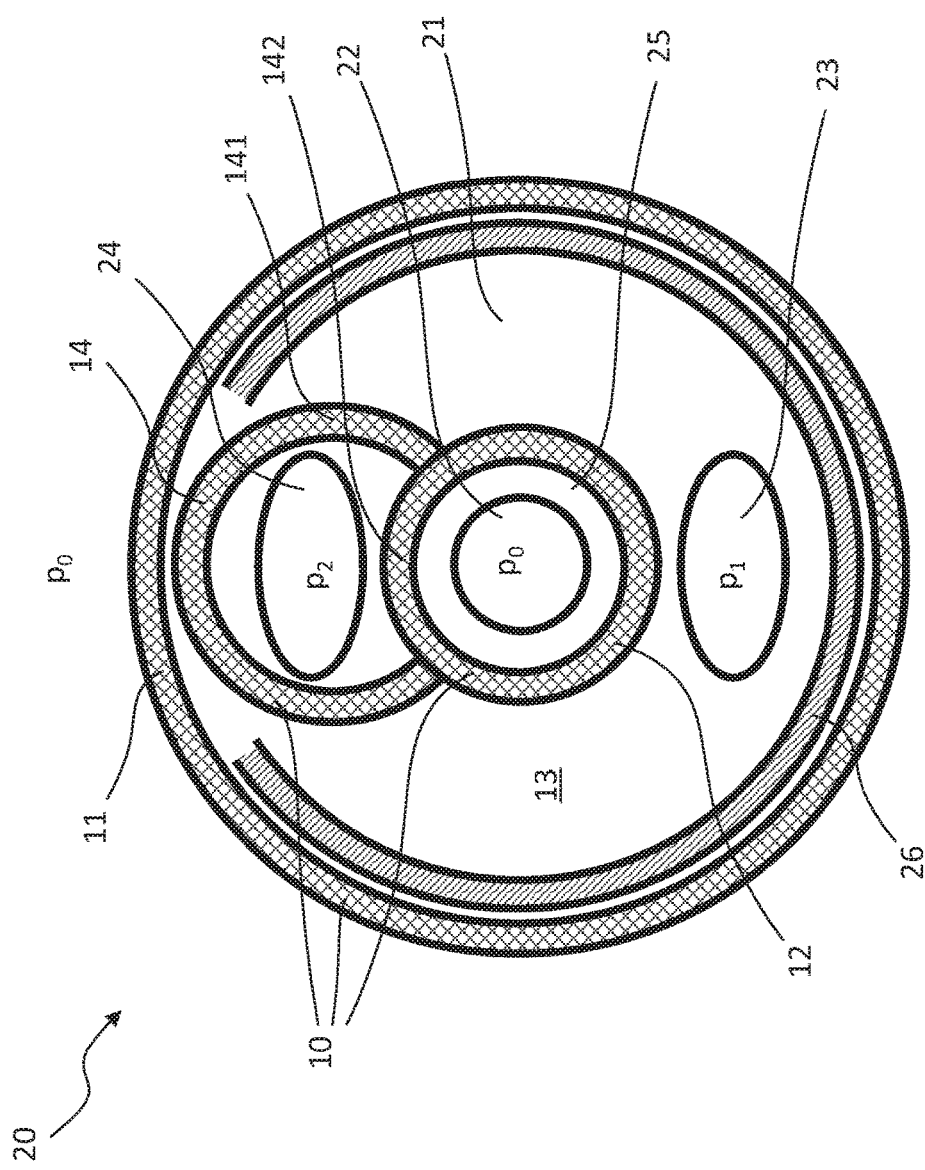

The invention will be described in greater detail using exemplary embodiments which are shown in the drawing. The proportions of the individual elements with respect to one another in the figures do not always correspond to the real proportions, since some shapes are simplified and other shapes are shown on an enlarged scale in comparison with other elements for improved illustration. Identical reference numerals are used for identical or identically acting elements of the invention. Furthermore, for the sake of clarity, only reference numerals are shown in the individual figures which are required for the description of the respective figure. The embodiments which are shown represent merely examples as to how the invention can be configured, and do not represent a conclusive restriction. In the drawing, in a diagrammatic illustration:

FIG. 1 shows a first exemplary embodiment of a seal arrangement according to the prior art for a vane cell pump of cartridge design with switchable flows at the same pressure level, in a plan view of its side plate which has the outlets of the flows;

FIG. 2 shows a second embodiment of a seal arrangement according to the prior art for a vane cell pump of stand-alone design with switchable flows at different pressure levels, in a plan view of its end side which has the outlets of the flows; and FIG. 3 shows a seal arrangement for a vane cell pump with switchable flows at different pressure levels, in a plan view of its side plate which has the outlets of the flows, and which is constructed in accordance with the teachings of the present invention.

DETAILED DESCRIPTION

One or more example embodiments of a sealing arrangement for a pump are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

A seal arrangement 10 (shown in full or in parts in FIG. 3) of a vane cell pump 20 of cartridge design is configured such that it can be switched into multiple flows, for example, in a manner which is dependent on temperature, comprises: a first seal 11 arranged so as to run around the circumference of a side plate 21, preferably the pressure plate of the vane cell pump 20; a second seal 12 arranged so as to run around a shaft leadthrough 22 provided in the same side plate 21 of the vane cell pump 20 for a drive shaft which can be connected or is connected to a rotor of the vane cell pump 20; and a third seal 14 which, apart from at least one first or remaining fluid connection 23 which forms an outlet of a first or remaining flow of the vane cell pump 20, shuts off at least a second fluid connection 24 which forms an outlet of at least one second flow of the vane cell pump 20 and is provided in or on the side plate 21 of the vane cell pump 20, with respect to the at least one first or remaining fluid connection 23 within a region 13 which is configured between the first seal 11 and the second seal 12.

The region 13 which is at the same primary pressure $p_1$ as that flow of the vane cell pump 20 and which opens by way of the at least one first or remaining fluid connection 23 is sealed with respect to an ambient pressure $p_0$ which prevails in a surrounding area by means of the first seal 11 of the seal arrangement 10.

The region 13 which is at the same primary pressure $p_1$ as that flow of the vane cell pump 20 and which opens by way of the at least one first or remaining fluid connection 23 is sealed with respect to the shaft leadthrough 22 and the ambient pressure $p_0$ which likewise prevails there by means of the second seal 12 of the seal arrangement 10.

The third seal 14 seals at least one second fluid connection 24, into which a second or further flow of the vane cell pump 20 opens, which second or further flow delivers at a secondary pressure $p_2$, preferably not directly with respect to the ambient pressure $p_0$, but rather shuts it off with respect to the region 13 which is at the primary pressure $p_1$.

The first seal 11 is preferably a radial seal or comprises a seal of this type. The first seal 11 is with preference an O-ring or it comprises a seal of this type. The second seal 12 is preferably an axial seal or comprises a seal of this type. The second seal 12 is, for example, a shaped seal or it comprises a seal of this type. The third seal 14 is preferably an axial seal or it comprises a seal of this type. The third seal 14 is, for example, a shaped seal or it comprises a seal of this type. The third seal 14 particularly preferably has a (for example) first part 141 which shuts off at least one second or further fluid connection 24 with respect to at least one first or remaining fluid connection 23.

In the seal arrangement 10 which is shown in FIG. 3, the at least one first or remaining fluid connection 23 opens into the region 13, with respect to which the (for example) first part 141 of the third seal 14 shuts off the second or further fluid connection 24.

Moreover, the third seal 14 can have a further (for example) second part 142 which seals at least one second or further fluid connection 24 with respect to the shaft leadthrough 22 and the ambient pressure $p_0$ which prevails there.

In the seal arrangement 10 which is shown in FIG. 3, the third seal 14 adjoins the second seal 12 directly. It is conceivable here that a part of the second seal 12 which adjoins the third seal 14 belongs to the third seal 14 and forms the addressed further part 142. In this case, in an embodiment of the seal arrangement 10 according to FIG. 3, the second seal 12 would not lead completely around the shaft leadthrough 22, but rather only around part of the shaft leadthrough 22. The remaining part of the circumference of the shaft leadthrough 22 which is not assumed by the second seal 12 would be assumed by the further (for example) second part 142 of the third seal 14.

One advantageous embodiment of the seal arrangement 10 provides that the third seal 14 and the second seal 12 are formed by a common seal element or are included by a common seal element, or form or comprise a common seal element.

It can be seen that the invention can be realized by way of a vane cell pump 20 of cartridge design which is equipped with a corresponding seal arrangement 10.

A captive securing mechanism or arrangement can be provided in order that the side plate 21, which preferably forms the pressure plate, cannot be detached from the pump during mounting and handling. A captive securing mechanism or arrangement for that side plate 21 of the vane cell pump 20 which is provided with the seal arrangement 10 can be realized by way of a circlip on a drive shaft which is guided through the shaft leadthrough 22 and can be connected or is connected to a rotor of the vane cell pump 20, for example by way of a securing element which is arranged on the drive shaft in the form of a securing ring which is also called a groove ring and is better known under the designation Seeger ring. The side plate 21 is preferably the pressure plate of the vane cell pump 20.

The second seal 12 can be guided around a projection 25 which is provided on the side plate 21 and fixes, for example clamps, the second seal in a frictionally locking and/or positively locking manner around the whole shaft leadthrough 22.

A spring element 26 can be arranged or an installation space for a spring element 26 can be kept clear in the region 13 which is configured between the first seal 11 and the second seal 12 and is at the primary pressure $p_1$ which is different from the delivery pressure of the second flow which corresponds to the secondary pressure $p_2$, which spring element 26 prestresses the side plate 21 axially against a contour ring of the vane cell pump 20 of cartridge design.

A spring element 26 of this type can be provided to exert a sufficiently great axial force in the closing direction on the side plate 21, for over-compression of the vane cell pump 20.

A first fluid connection 23 (also called a primary outlet) of a first flow of the vane cell pump 20 and a second fluid connection 24 (also called a secondary outlet) of a second flow of the vane cell pump 20 are preferably provided in the side plate 21. Both the first fluid connection 23 and the second fluid connection 24 open within the first seal 11 which surrounds the outer circumference of the side plate 21 and outside the second seal 12 which surrounds the shaft leadthrough 22 in the side plate 21.

In order for it to be possible to not only switch the two flows of the vane cell pump 20 of cartridge design separately, but rather also for it to be possible to operate them at a different pressure level, the second fluid connection 24, into which the second flow of the vane cell pump 20 opens, is separated by way of the third seal 14 from the region 13 which is at primary pressure $p_1$ and comprises the first fluid connection 23, into which the first flow of the vane cell pump 20 opens. As a result, the two flows can be operated at different pressure levels. Moreover, the first fluid connection 23 and the second fluid connection 24 provide axial outlets which are advantageous for the cartridge design for the two flows at a different pressure level in the pressure plate region.

The three pressure levels ambient pressure $p_0$, primary pressure $p_1$ of the first flow, secondary pressure $p_2$ of the second flow are separated from one another by the seal arrangement 10 by way of its first seal 11, second seal 12 and third seal 14.

It is important to highlight that the seal arrangement must not be detached from the pump during mounting and handling. Accordingly, an abovementioned captive securing mechanism or arrangement can be provided for the side plate 21 which is configured, for example, as a pressure plate, by way of which captive securing means not only the side plate 21, but rather also the first seal which is configured, for example, as a radial seal, for example as an O-ring, and is preferably arranged on the circumference of the side plate 21, for example in a circumferential groove which is provided on a circumferential face, are secured.

For example, a common seal element which forms or comprises the second seal 12 and the third seal 14 can be fixed for securing against loss in a positively locking manner on a projection 25 which is provided on the side plate 21 and surrounds the shaft leadthrough 22. The said projection 25 can have, for example, a circumferential undercut, the shape of which replicates the seal element and thus engages into it. As an alternative or in addition, a corresponding projection, optionally likewise with a (for example) circumferential undercut, can be configured so as to run around the second fluid connection 24. In the case where corresponding projections 25 are configured both around the shaft leadthrough 2 and around the second fluid connection, a common seal element can additionally be clamped between the two projections in the region of the part 142. Fluid connections of the corresponding side which form the oil passages can be situated at any desired position. The installation space is unchanged with respect to the prior art.

It can be seen that the invention can be realized by way of a seal of three pressure levels by means of O-ring radially and axial seal in combination with a captive securing means of the seal arrangement 10 and the side plate 21 which is configured, for example, as a pressure plate, for example by means of a circlip, and the use of a suitable spring element 26 for the axial prestress of the vane cell pump 20.

The first flow is separated radially from the ambient pressure $p_0$ by means of the first seal 11 which is configured, for example, as a radial seal, preferably as an O-ring.

The first flow is preferably separated from the second flow by way of an axial seal, with preference in the form of a common seal element which forms or comprises the second seal 12 and the third seal 14.

Here, the axial seal is divided into two segments. A first segment which forms the third seal 14 comprises the second fluid connection 24 (also called a secondary passage) of the second flow through the side plate 21 which is configured, for example, as a pressure plate. If the secondary pressure is lowered and in the process the area within that region of the second flow connection 24 which is enclosed by the third seal 14 is kept as small as possible, this aids the over-compression of the vane cell pump 20. Furthermore, in the case of a secondary area which is as small as possible, the primary area which corresponds to the region 13 is as great as possible. This means that the installation space which is available for a spring element 26 in the region 13 likewise becomes as great as possible. One possible embodiment of the spring element 26 is, for example, an open corrugated spring.

A captive securing mechanism or arrangement which is optionally provided for the side plate 21 (which is configured, for example, as a pressure plate) can be realized by means of a passage of a shaft, preferably a drive shaft of the rotor of the vane cell pump 20 through the side plate 21, and a securing ring which interacts with the shaft. Here, ambient pressure $p_0$ prevails in the region of the shaft passage 22. The ambient pressure $p_0$ has to be separated from the primary pressure $p_1$ and from the secondary pressure $p_2$.

A second segment of the axial seal which forms the second seal 12 assumes this task. Clamping of the seal, optionally with an undercut, in the centre of the side plate 21 which is configured, for example, as a pressure plate is possible as a result of the round shape of the second seal segment. The captive securing action of the seal arrangement 10 is ensured as a result. If required, the axial seal can be supplemented by a supporting element.

Advantages in comparison with the prior art are an optimum utilization of the small amount of installation space which is available for the cartridge design, a simple captive securing means of the pressure plate or side plate 21 and the seal arrangement 10, and a satisfactory over-compression of the vane cell pump 20 in the switched state which represents the critical case.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A vane cell pump of cartridge design which is configured such that it can be switched into multiple flows, comprising:
   a side plate defining a first fluid connection for receiving a first fluid flow of the vane cell pump, a second fluid connection for receiving a second fluid flow of the vane cell pump, and a shaft leadthrough for receiving a drive shaft;
   a first seal arranged so as to run around a circumference of the side plate of the vane cell pump;
   a second seal arranged so as to run around the shaft leadthrough; and
   a third seal sealing the second fluid connection from the first fluid connection within a region which is located between the first seal and the second seal, wherein the third seal does not surround the second seal.

2. The vane cell pump according to claim 1, wherein the first seal is a radial seal.

3. The vane cell pump according to claim 1, wherein the first seal is an O-ring.

4. The vane cell pump according to claim 1, wherein the second seal is an axial seal.

5. The vane cell pump according to claim 4, wherein the second seal is a shaped seal.

6. The vane cell pump according to claim 1, wherein the third seal is an axial seal.

7. The vane cell pump according to claim 6, wherein the third seal is a shaped seal.

8. The vane cell pump according to claim 1, wherein the third seal has a first part which shuts off the at least one second fluid connection with respect to the at least a first fluid connection, and a second part which seals the at least one second fluid connection with respect to the shaft leadthrough.

9. The vane cell pump according to claim 8, wherein the third seal and the second seal are formed by a common seal element.

10. The vane cell pump according to claim 1, wherein a spring element is positioned between the first seal and the second seal.

11. A vane cell pump of cartridge design which is configured such that it can be switched into multiple flows, comprising:
- a side plate disposed about an axis and having an outer circumference, and defining a first fluid connection for receiving a first fluid flow of the vane cell pump, a second fluid connection spaced from the first fluid connection for receiving a second fluid flow of the vane cell pump, and a shaft leadthrough spaced from the first and second fluid connections for receiving a drive shaft;
- a first seal disposed about the outer circumference of the side plate of the vane cell pump;
- a projection extending axially from the side plate and disposed about the shaft leadthrough;
- a second seal extending about the projection and fixed in place about the shaft leadthrough by the projection and sealing the shaft leadthrough; and
- a third seal positioned about and sealing the second fluid connection relative to the first fluid connection, wherein the third seal does not surround the second seal and the shaft leadthrough.

12. The vane cell pump according to claim 11, wherein the second and third seals are formed by a common seal element.

13. The vane cell pump according to claim 11, wherein the third seal does not surround an entire outer perimeter of the second seal.

14. The vane cell pump according to claim 1, wherein the second and third seals are formed by a common seal element.

15. The vane cell pump according to claim 11, wherein the third seal does not surround an entire outer perimeter of the second seal.

* * * * *